Figure 10:
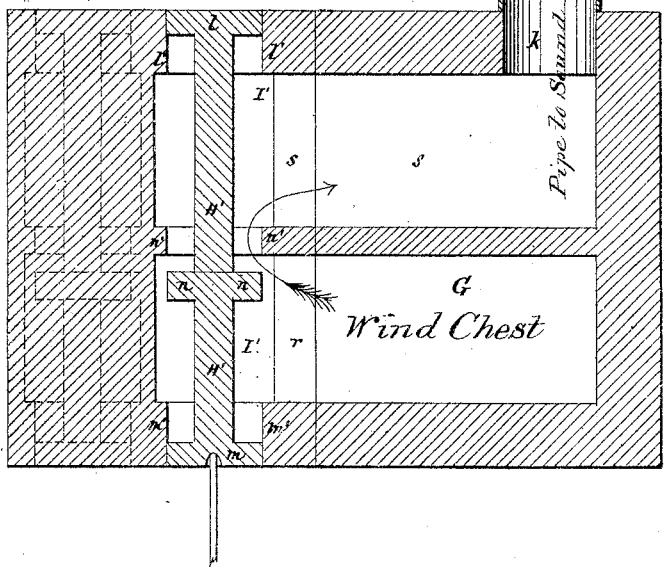

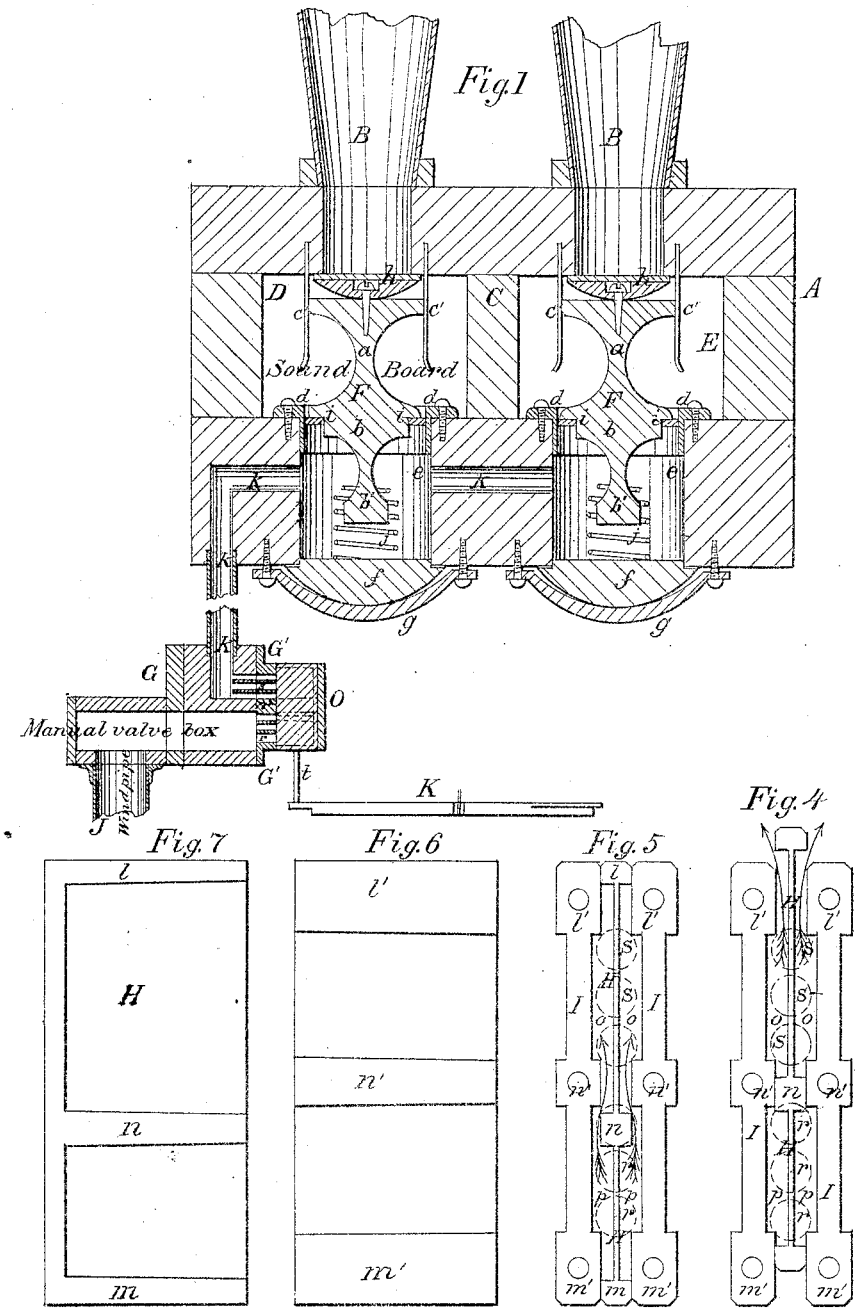

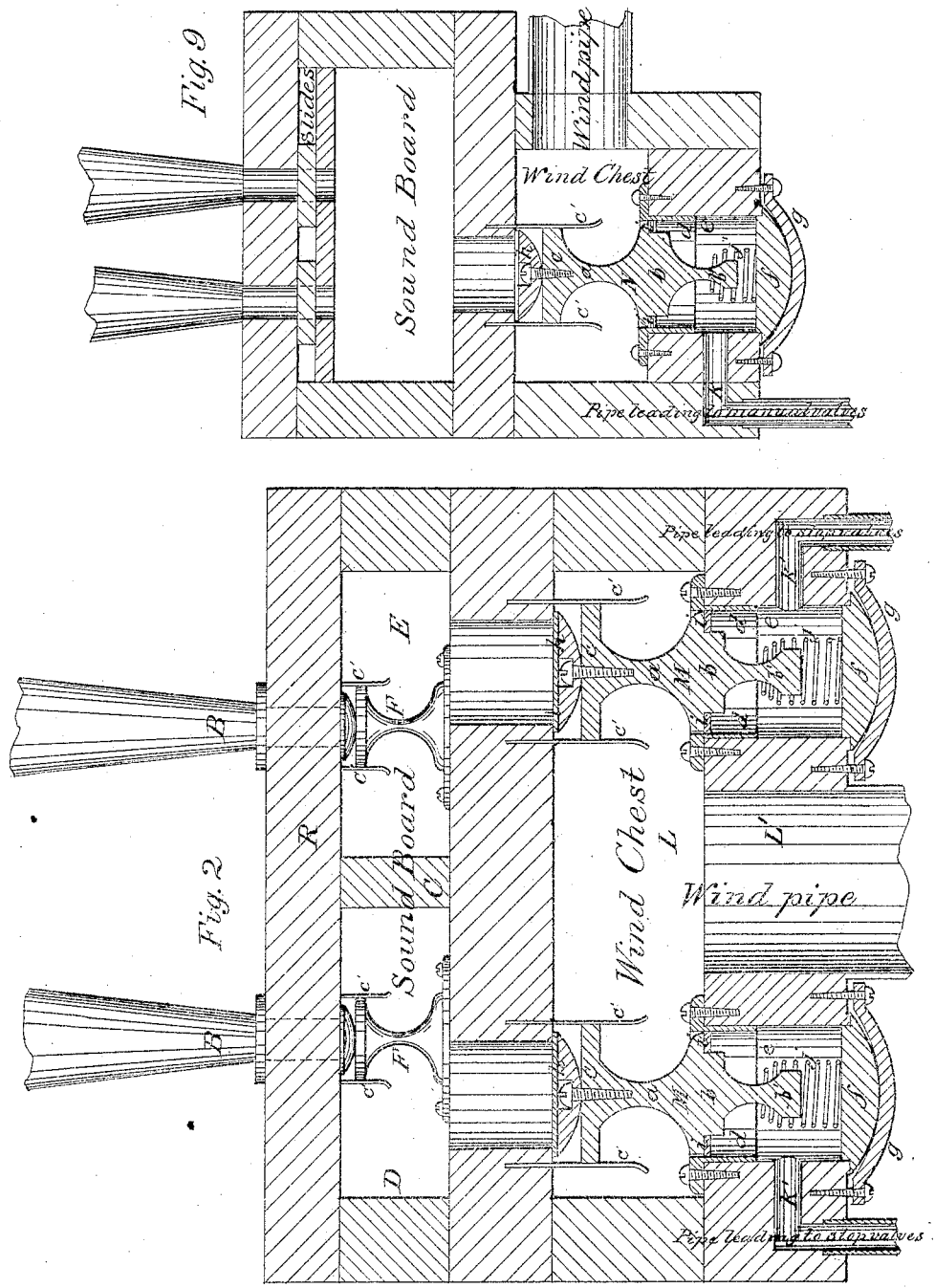

4 Sheets--Sheet 3.
T. WINANS.
Pneumatic Actions for Organs.
No. 143,602. Patented Oct. 14, 1873.
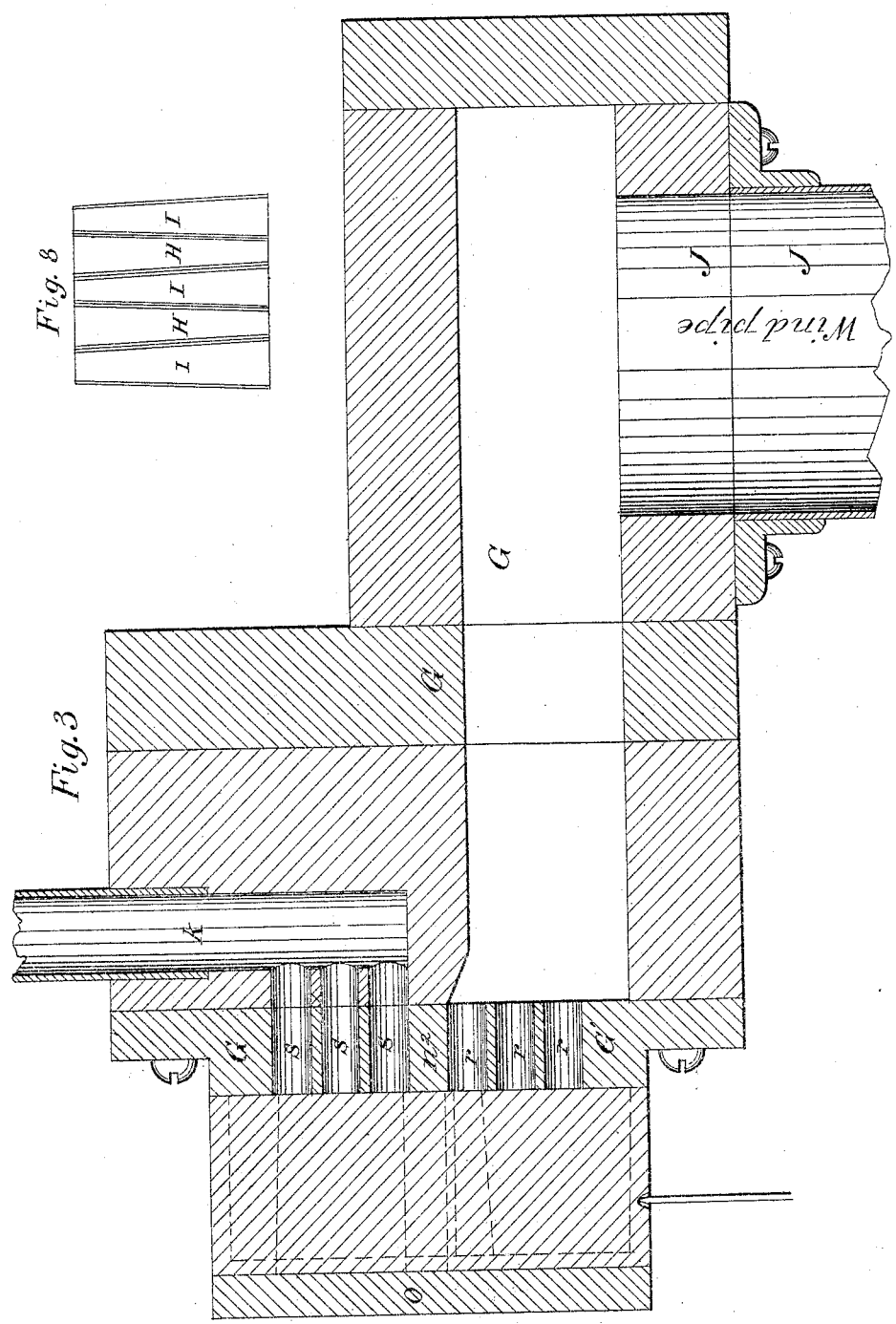
Witnesses:
John Bulkley
W. E. Chaffee
Inventor:
Thomas Winans
by atty Pollok 4 Sheets--Sheet 4.

T. WINANS.
Pneumatic Actions for Organs.

No. 143,602. Patented Oct. 14, 1873.

Witnesses: Inventor:

UNITED STATES PATENT OFFICE.

THOMAS WINANS, OF BALTIMORE, MARYLAND.

IMPROVEMENT IN PNEUMATIC ACTIONS FOR ORGANS.

Specification forming part of Letters Patent No. 143,602, dated October 14, 1373; application filed July 22, 1873.

*To all whom it may concern:*

Be it known that I, THOMAS WINANS, of Baltimore, Baltimore county, Maryland, have invented certain new and useful Improvements in Pneumatic Action for Organs, of which the following is a specification:

This invention, which relates to that kind of action for organs known as pneumatic action, is directed particularly to the construction and arrangement, both of the valves for controlling the pneumatic action, and also of the pneumatic valves which regulate the admission of air to the pipes, or to the wind-chests of the several registers or stops. The objects I have had in view are principally to increase the facility of the action, rendering it similar, in ease of manipulation of the keys, to a piano action; also to permit a very considerable increase of blast or wind pressure over that to which organs are usually restricted; and also to so construct the action that its several parts may be made by machinery, and without requiring the manual labor in making, as well as in putting it in place and adjusting it, which is one of the chief sources of expense in the building of organs. I govern the action of the pneumatic stop-valves (which control the entrance of air to the pipes, or to the wind-chests under the several registers) by means of balanced slide-valves, arranged so that in their normal position they will, through suitable air-passages with which they communicate, admit wind to one side of the stop-valves at the same pressure as that at which the wind presses (when admitted to the register-chest) on said pallets or valves from the other side; and they are made so that, under all conditions, the pressure of the blast passing through them will be equally distributed on all of their sides, in order that at every point of their movement they may be entirely balanced. In this way, no matter what the force of the blast may be, the slide-valves will operate always in the same way with equal ease, and without requiring the application of increased power in order to move them. The movement of the balanced slide-valves by the keys, or manual, or otherwise, is designed to bring them into position to shut off the blast from their air-admission valves, and to bring the latter on one side in communication with the external atmosphere, so that by thus reducing the pressure on one side of the stop-valves the confined air on the other side may be free to act to force them back from the openings which they are designed to close, and thus open a passage for itself into the register wind-chests, or the pipes, as the case may be.

Balanced slide-valves thus made and operating are of special value, when combined with and arranged to be actuated by the keys or manual: For, as the valves, so far as wind-pressure is concerned, are at all times balanced, they can be moved by the keys, or by stickers connected with the latter, with great facility, their construction being such that they will slightly overbalance the keys, so that, after having been lifted, they will return to their normal position at once when pressure is removed from the keys.

By properly proportioning the valves and keys a piano-like action can readily be obtained, no matter what the air-pressure may be.

The usual force of blast to which organs are restricted is the equivalent of a column of water three inches in height; but with air-action, constructed as I propose, the blast may be increased so that its force will equilibrate a column of water of any desired height, and this without in any way impairing the facility of the action.

The manner in which my invention is or may be carried into effect will be understood by reference to the accompanying drawing, in which—

Figure 1 is a transverse vertical section of part of the sound-board of an organ and the pneumatic action connected with the same. Fig. 2 is a like section, representing additional parts designed to control the supply of air to the wind-chests of the several registers or stops. Fig. 3 is a section on an enlarged scale of the manual-valve box or box which contains the balance slide-valves. Fig. 4 is an end view of the slide-valve and its plates or "partitions," representing the valve open. Fig. 5 is a like view of the same parts with the valve closed. Fig. 6 is a side elevation of one of the stationary plates or partitions. Fig. 7 is a side elevation of the valve. Fig. 8 is a top view of the valve and its inclosing plates or partitions. Fig. 9 is a transverse vertical section of a sound-board provided with sliders, to which my system is adapted.

My invention is applicable to organs of usual construction provided with sliders for different stops; but I prefer to provide a separate pneumatic stop-valve for each pipe, and this arrangement I shall first describe.

In Fig. 1, A is a sound-board, so called—a box-like structure, to openings in the top of which the pipes B are fitted. The box is divided, by partitions C, into as many separate chests D E as there are registers or stops. The pipes of each register or stop open into their own chest, which is distinct and separate from the others. Each pipe is provided with an air-admission valve, F, which I prefer to construct and arrange as seen in the figure. It is composed of a stem, $a$, terminating at the lower end in a round base, $b$, and at the upper end in a head, $c$, of corresponding contour, which is supported between guide-wires $c'$, three, four, or more in number, extending downward from the under side of the top, to which the pipes are secured. The base of the valve fits in a metallic bearing-sleeve, $d$, within a cylindrical chamber or socket, $e$, formed in the bottom of the sound-board, which socket or chamber I prefer to extend all the way through the bottom of the sound-board, closing it at the bottom by a removable plug, $f$, held in place by a metallic yoke or strap, $g$. This enables the valve to be taken out from below. To the head $c$ is attached the valve proper, consisting of a button-like disk, $h$, flat on its upper side, which is coated with leather, and convex on its under side, and attached, by a pin or screw, to the head $c$ in such manner that it may be capable of a slight oscillating movement, in order to adapt itself more readily and accurately to the pipe-orifice which it closes. The base $b$ is provided with an annular packing-ring, $i$, of antifriction metal or other suitable material, which works closely against the bearing-sleeve $d$; and between the base of the valve and the plug $f$ is a spring, $j$, in the chamber $e$, which overcomes the weight of the valve, and presses it up against the top of the sound-board. This spring may be dispensed with entirely by using a higher pressure of air for the manual valves than for the sound-board of the organ, and in some instances this may be preferable. In this case all the valves opening to pipes of the same note would open and close at each touch of the key, while, when the springs are used, only those move which have the stop open for them.

The valve thus constructed and arranged, is capable of working up and down as far as the tail-piece $b'$ of the lower end will allow it, between the guide-wires and within the bearing-sleeve. Confining attention to the valve on the left in Fig. 1, it will be seen that if wind under pressure be let into chamber $e$ the valve will be pressed upward, both by the air and by the spring $j$. But if air at the same pressure be let into chest D, this air, acting on the valve from the opposite side, and pressing both up against the valve proper and down on base $b$, will neutralize the air-pressure in chamber $e$, and the valve will consequently be upheld by the spring and pressure of the air within the sound-board on the valve at the top of sound-board, due to the size of the orifice the valve closes. Now, if the confined air be allowed to escape from chamber $e$, there will remain only the spring below and the pressure of the valve $h$ closing the orifice to counteract the downward pressure of air in the sound-board on that part of the valve that plays in the chamber $e$; and this air-pressure, which must, by a proper proportion of the socket or chamber $e$, exceed that of the spring and valve proper, will at once force the valve down, and thus open a passage from chest D into the pipe. If the chambers of the valve of corresponding pipes in the different registers be connected, so that air may be forced into or exhausted from all simultaneously, then as many of such valves as have their register-chests supplied with air under pressure can be operated simultaneously and in unison. The means by which the stop or air-admission valves are thus actuated constitutes an important feature of my invention, and are fully represented in Figs. 1, 3, 4, 5, 6, 7, and 8. The sound-board in Fig. 1 contains but two registers; but it, of course, may have as many more as desired. The chambers $e$ of the valves of the corresponding pipes of the several registers are connected by a duct or passage, $k$, leading into the manual-valve box G, which contains the balance slide-valves hereinbefore referred to. There is one such valve for each key. Each valve is composed of a thin plate, H, preferably made of babbitt metal, or some anti-friction non-corrosive metallic alloy or compound, provided on each side with three horizontal ribs, one, $l$, at the top, one, $m$, at the bottom, and one, $n$, intermediate between the two. This valve fits closely and snugly between two plates or partitions, I, which are formed with similar horizontal ribs $l'$ $m'$ $n'$, so arranged that at least two of the horizontal ribs on the sides of the valve will always find a bearing between them. When the valve and valve-plates are thus fitted together, it will be seen that two valve-spaces, an upper one, $o$, and lower one, $p$, are produced. The intermediate ribs $n'$ of the plates or partitions are about midway between the top and bottom ribs $l'$ $m'$. On the contrary, the rib $n$ of the valve is below the center of the valve-plate, so that when the valve is in its lowest position, as seen in Fig. 5, the rib $n$ will be below and out of contact with the ribs $n'$, thus leaving free communication between the upper and lower valve-spaces. When on the contrary the valve is elevated so as to lift the upper rib $l$ above the ribs $l'$, and out from between the partitions, thus throwing the upper chamber open to communication with the atmosphere, the rib $n$ will have been raised enough to fit between the ribs $n'$, and thus close the communication between the two spaces. These valves and partitions are placed vertically on one side of the manual-valve box, the valve-plates or partitions being secured thereto at proper distances apart to receive the valves; and in the side of the manual-valve box are formed two series of apertures, the one, $r$, opening into the lower valve-space $p$, the other, $s$, into the upper valve-space $o$. Separate and distinct apertures in each series communicate with the separate valve-spaces of the several valves, and there is no communication between the upper and lower apertures $s$ and $r$ belonging to each valve, except through the spaces $o$ and $p$ of that valve. One pipe or duct, $k$, leads to each aperture or range of apertures $s$ belonging to each upper valve-space $o$, and the lower series of apertures $r$ communicate with the interior of the manual-valve box G, which is filled always with air taken from the source of air-supply by the wind trunk or pipe J. Each valve is connected with its key K by a sticker, $t$. By depressing the key the sticker will be caused to raise the valve, and when the finger is removed from the key the valve will fall of its own weight.

Under the arrangement described, it will be seen that when the slide-valves are in their normal position the compressed air from the manual-valve box will enter the lower valve-spaces $p$ through apertures $r$; thence pass up between ribs $n$ $n^1$ into spaces $o$, as indicated in Fig. 5, and thence through apertures $s$ and pipes $k$ into the valve-chambers $e$ to press upward the pneumatic pallets or valves F. If, however, any one of the slide-valves be lifted by depressing its key, then the communication between the upper and lower valve-spaces $o$ $p$ will be cut off, the blast of air from the manual-valve box will be confined within the lower space, and the upper space will be open to the atmosphere, thus relieving the air-pressure on the under side of its pneumatic pallet or valve, or series of such valves, and allowing the compressed air, in as many of the register-chests as are open, to depress the valves thus relieved, and to find its way into the pipes previously closed by the same. The air thus expelled from duct $k$ exhausts from upper space $o$ into the atmosphere. The rib $n$ is so placed with relation to ribs $n^1$ that it will close the lower space at, or, preferably, a little before, the time the upper space is opened to the atmosphere.

It will be noticed that, with a valve thus constructed and arranged, the air-pressure is at all times the same on all sides of the valve, so as to maintain it, so far as that pressure is concerned, in equilibrium, or balanced. When the valve is closed, as indicated in Fig. 5, the pressure of the air within the spaces $o$ $p$ is the same on both sides of the valve, and at its top and bottom. When the valve is open the conditions are unchanged, the center rib $n$ taking the place of the upper rib $l$ and closing the lower space, so as to cause an equilibrium of pressure within the only valve-space that now contains air under pressure. Thus, no matter how great the pressure of air, the valve-action will always be equable and the same, and no increase of power will be needed to depress the key. By properly proportioning, therefore, the weight of the valve to the leverage of the key the organ will be rendered sensitive to the slightest touch, and the action will be as light as that of a piano.

I prefer to arrange the ribbed slide-valves and their stationary ribbed plates on a breast-plate, G', attached to the valve-box G, which plate is provided with a longitudinal partition, $n^2$, corresponding to the central ribs $n^1$ of the stationary plates, and is formed below and above said longitudinal partition with apertures $r$ $s$, which, as above stated, lead, respectively, from the lower valve-space $p$ of each valve to the wind-chest of the valve-box, and from the upper valve-space $o$ to the pneumatic-valve air-duct or passage $k$.

While I prefer to construct the manual valves flat, as above described, I do not confine myself to that shape, as they may be constructed round, or square, or polygonal, by placing them diagonally or zigzag, and still be effective, and combine the same principle of action.

Figure 11:
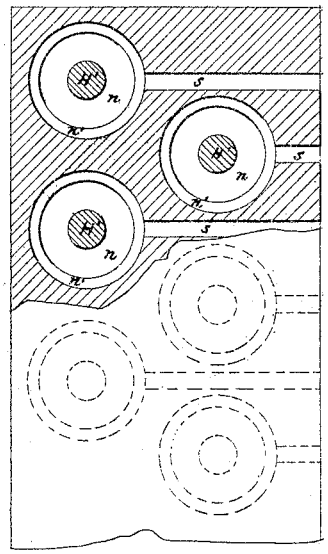

Such an arrangement is shown in Figs. 10 and 11, Fig. 10 being a vertical transverse section of a manual-valve box provided with cylindrical internally-ribbed valve-chambers I', each having a piston-rod, H', provided with three pistons or flanges corresponding to the three ribs of the flat valves hereinbefore described. Fig. 11 is a top view, partly in horizontal section, of a portion of the valve-box, representing a portion of valves. The ribs $l'$ $m'$ $n'$ in the valve-chambers, and the ribs, flanges, or pistons $l$ $m$ $n$ of the valves or piston-rods, correspond to the like lettered parts in the preceding figures, and have the same relative arrangement and principle of operation.

No matter what the peculiar configuration of the parts there is the common feature in all the valve arrangements herein shown of valves and valve-chambers, communicating through the spaces formed within them with the source of wind-supply, and the ducts leading to the pneumatic valves, and operating to put said ducts in communication with the source of air-supply or with the external atmosphere, as desired, the valves being balanced at all points of their movement.

In order to admit air to the several register wind-chests, substantially the same arrangement of valves may be employed, as indicated in Fig. 2. In this figure, L is the main wind-chest, supplied with wind from the wind-trunk L', and provided with pneumatic stop-valves M, one for each register wind-chest.

The construction and arrangement of these valves is entirely the same as above described with reference to the pneumatic pipe-valves, excepting that each valve has a distinct and separate air-passage or duct, $k'$, which leads to a balanced slide or other valve, the movement of which is controlled by a stop on the organ.

In other words, the same kind of action may be employed to control the different registers, as well as the pipes themselves, the difference being that in the former case the balanced valves are operated by the stops, and in the latter case by the keys.

In case sliders are employed, as indicated in Fig. 9, then, of course, it will not be necessary to provide each pipe with an independent valve. One valve, N, only will be needed for each range of corresponding pipes in the several registers, and the throwing of the various registers into or out of action will be governed by the sliders in the usual way. The valves N are, of course, connected with and controlled by balanced slide-valves in the manual-valve box in the manner above described.

It will thus be seen that my invention is applicable either to the slider system or to the system first above described, of an independent pneumatic valve for each pipe.

The ribs on the balanced slide-valves are made preferably tapering in horizontal section, as indicated in Fig. 8, and a corresponding taper is formed on the contiguous sides of the valve partitions or plates, the object being to obtain a close and snug fit between the valves and the plates. For the same reason the ribs of the valve and of the plates are made to taper at their top and bottom, as indicated in Figs. 6 and 7.

When the valves and valve-plates are screwed or fastened in place on the box they are held together on the outside edge by a covering-plate, O, applied to the upright ends of the valve-plates, and extending the length of the whole series. The slide valves and plates can be readily cast and then finished by machinery, and the pneumatic valves also can be readily made by machinery. The whole action action indeed is simplified, and can be produced at small expense in comparison with that involved in the manufacture of organ actions, as heretofore practiced.

Having now described my invention, and the manner in which the same is, or may be, carried into effect, I wish it to be understood that I do not confine myself to the precise mechanical details of construction herein set forth, for the same may be varied considerably without departure from the principles of my invention; but

What I claim, and desire to secure by Letters Patent, is—

1. A pneumatic action for organs, comprising the combination, with the pneumatic valves directly regulating the admission of air to the register-chests or the pipes, of valves and inclosing valve-chambers, communicating on the one side with the source of compressed-air supply, and on the other side with ducts leading to said pneumatic valves, said parts being constructed and arranged to operate substantially as herein shown and described, so that whether the valves be opened to throw the said ducts, in communication with the source of compressed-air supply, or closed to shut off such communication and allow the air in the ducts to exhaust therefrom, the compressed air contained in the valve-chambers will at all times exert equal pressure on all parts of the valves so as to balance them.

2. The slide-valves, provided each with top, bottom, and intermediate ribs, as described, in combination with their valve-chambers, provided each with a corresponding number of ribs, the same being formed and arranged with relation to one another, substantially as shown and described, for the purposes set forth.

3. In combination with the said ribbed slide-valves and correspondingly-ribbed valve-chambers, arranged relatively to each other, as described, the manual-valve box containing a wind-chest opening into one of the valve-spaces formed in each valve-chamber, and air ducts or passages leading out of the other valve-space in said chamber to the pneumatic valves, said parts being arranged for joint operation, in the manner herein set forth.

4. The ribbed slide-valves and their stationary ribbed partitions or plates, arranged on and carried by a breast-plate on the valve-box, provided with a longitudinal partition corresponding to the central ribs of the stationary plates, and formed below and above said longitudinal partition with apertures leading respectively from the lower valve-space of each valve to the wind-chest of the valve-box and from the upper valve-space to the pneumatic air duct or passage, substantially as and for the purposes shown and set forth.

5. The combination, with the balanced slide-valves, the chambers for said valves, and the manual-valve box arranged together, substantially as described, of the pneumatic valves, one for each organ-pipe, arranged in the register wind-chests to play up and down in valve-chambers, communicating with their respective slide-valves by ducts or passages which, by means of said slide-valves, may be thrown into communication either with the source of compressed-air supply or with the external atmosphere, substantially as and for the purposes shown and set forth.

6. The pneumatic valve herein described, consisting of a stem provided with a head playing between guides and carrying an oscillating valve proper, and a base fitting and arranged to move up and down in a bearing-sleeve within a socket or air-chamber, and upheld by a spring, or otherwise, as specified, the said valve being arranged within the register wind-chest or the main wind-chest, as the case may be, and operated by the difference between the air-pressures in the said chamber and the wind-chest in which said valve is located, substantially as set forth.

In testimony whereof I have signed my name in the presence of two subscribing witnesses.

THOMAS WINANS.

Witnesses:
 JOHN BULKLEY,
 CHAS. W. TILLEY.